US012638750B2

(12) United States Patent
Luo et al.

(10) Patent No.: US 12,638,750 B2
(45) Date of Patent: May 26, 2026

(54) CAMERA MODULE HAVING A MOVABLE ASSEMBLY, A METAL GUIDE RAIL, A ROLLING MEMBER FORMING A ROLLING CONTACT WITH A SUPPORT MEMBER AND A LOCKING STRUCTURE COMPRISING A GUIDE RAIL EXTENDING IN A DIRECTION PARALLEL TO A MOVEMENT DIRECTION

(71) Applicant: GALAXYCORE SHANGHAI LIMITED CORPORATION, Shanghai (CN)

(72) Inventors: Jun Luo, Shanghai (CN); Yong Xu, Shanghai (CN)

(73) Assignee: GALAXYCORE SHANGHAI LIMITED CORPORATION, Shanghai (CN)

( * ) Notice: Subject to any disclaimer, the term of this patent is extended or adjusted under 35 U.S.C. 154(b) by 73 days.

(21) Appl. No.: 18/693,118

(22) PCT Filed: Sep. 14, 2022

(86) PCT No.: PCT/CN2022/118635
§ 371 (c)(1),
(2) Date: Mar. 18, 2024

(87) PCT Pub. No.: WO2023/040873
PCT Pub. Date: Mar. 23, 2023

(65) Prior Publication Data
US 2024/0288752 A1      Aug. 29, 2024

(30) Foreign Application Priority Data

Sep. 18, 2021     (CN) .......................... 202111100817.2

(51) Int. Cl.
*H04N 5/335*          (2011.01)
*G03B 13/36*          (2021.01)
(Continued)

(52) U.S. Cl.
CPC ............. *G03B 13/36* (2013.01); *H04N 23/51* (2023.01); *H04N 23/54* (2023.01); *H04N 23/57* (2023.01)

(58) Field of Classification Search
CPC ...................................................... G03B 13/39
See application file for complete search history.

(56) References Cited

U.S. PATENT DOCUMENTS

2011/0269317 A1*  11/2011  Knoedgen .............. H01R 41/00
                                                        74/490.09
2016/0085086 A1    3/2016  Rho et al.

FOREIGN PATENT DOCUMENTS

CN          105446053 A        3/2016
CN          207895137 U        9/2018
(Continued)

OTHER PUBLICATIONS

Chinese Office Action for CN Patent Application No. 202111100817.2 dated Mar. 26, 2025, with English translation.
(Continued)

*Primary Examiner* — Gary C Vieaux
(74) *Attorney, Agent, or Firm* — Merchant & Gould P.C.

(57) ABSTRACT

The present disclosure provides a camera module and a digital device including the camera module. The camera module includes a movable assembly and a fixing assembly. The movable assembly includes a carrier and a first rolling member arranged on a side wall of the carrier, and the first rolling member has a protruding surface protruding from the side wall of the carrier. The fixing assembly includes a base. The base is provided with a first support member, and the first support member is provided with a metal guide rail extending along a direction of an optical axis. When the carrier is installed on the base, the protruding surface of the first rolling member comes into contact with the metal guide rail, and when the movable assembly moves, the first rolling (Continued)

member moves with the movable assembly and forms a rolling or sliding contact with the first support member.

16 Claims, 6 Drawing Sheets

(51) Int. Cl.
  *H04N 23/51*  (2023.01)
  *H04N 23/54*  (2023.01)
  *H04N 23/57*  (2023.01)

(56)  References Cited

FOREIGN PATENT DOCUMENTS

| | | | | |
|---|---|---|---|---|
| CN | 109889711 A | 6/2019 | | |
| CN | 112394496 A | 2/2021 | | |
| CN | 112492126 A | 3/2021 | | |
| CN | 212658927 U | * | 3/2021 | ............... G02B 7/04 |
| CN | 113132564 A | 7/2021 | | |
| CN | 113411484 A | 9/2021 | | |
| CN | 116707259 A | * | 9/2023 | ............... G02B 7/04 |
| JP | 2007310242 A | 11/2007 | | |
| KR | 20140144126 A | 12/2014 | | |
| KR | 102710155 B1 | * | 9/2024 | ............. H04N 23/54 |

OTHER PUBLICATIONS

International Search Report and Written Opinion issued for International Patent Application No. PCT/CN2022/118635 mailed Dec. 12, 2022 with English translation of Search Report.

* cited by examiner

CAMERA MODULE HAVING A MOVABLE ASSEMBLY, A METAL GUIDE RAIL, A ROLLING MEMBER FORMING A ROLLING CONTACT WITH A SUPPORT MEMBER AND A LOCKING STRUCTURE COMPRISING A GUIDE RAIL EXTENDING IN A DIRECTION PARALLEL TO A MOVEMENT DIRECTION

CROSS-REFERENCE TO RELATED APPLICATIONS

This application is the National Phase of International Application No. PCT/CN2022/118635, filed on Sep. 14, 2022, which claims the priority to Chinese Patent Application No. 202111100817.2, filed on Sep. 18, 2021, with the China National Intellectual Property Administration, the entire contents of which are incorporated into this application by reference.

TECHNICAL FIELD

The present disclosure relates to the technical field of camera modules, and more particularly to a camera module and a digital device including the camera module.

BACKGROUND

At present, most mobile devices, such as mobile phones and tablet computers, are equipped with camera modules, which can realize a conversion between optical signals and electrical signals and record and save image information to realize functions of taking pictures and photographing. Compared with traditional camera systems, a cell phone camera module (CCM) is widely used in various new-generation portable camera devices due to its advantages of miniaturization, low power consumption, low cost and high image quality.

At present, a camera module includes a lens assembly, a voice coil motor (VCM), an infrared cut filter, an image sensor, a flexible printed circuit board (FPC) or a printed circuit board (PCB), and a connector connected with a mobile phone motherboard. The voice coil motor can realize an autofocus function of the lens assembly, and the voice coil motor usually includes magnets, coils and other structures. During an operation of the camera module, the coils are first powered on to cut magnetic induction lines in a magnetic field to generate an electromagnetic force, and the coils or magnets move under the action of the electromagnetic force, to drive the lens assembly connected with the voice coil motor to move to adjust an image distance and an object distance of the camera module and present a clear image. Usually, a Hall-effect sensor can also be installed in the voice coil motor, and the Hall-effect sensor can measure a change of the magnetic field in the voice coil motor, and realize a closed-loop control of the voice coil motor by determining a position of the coils or magnets according to the change of the magnetic field. Usually, the autofocus function in the cell phone camera module is completely accomplished by an entire driver.

With a rapid development of smartphone industry, people's requirements for an imaging effect of mobile phone cameras are gradually increasing. A zoom range of a focal length is an important factor affecting the imaging effect of the mobile phone cameras, which requires the voice coil motor to be able to perform a large stroke driving, while the large stroke driving requires maintaining a camera stability in a stroke range, which puts high demands on a stability of the voice coil motor.

SUMMARY

An embodiment of the present disclosure is to provide a camera module with a large stroke and capable of maintaining stable movement of a lens assembly.

An embodiment of the present disclosure provides a camera module. The camera module includes a movable assembly and a fixing assembly. The movable assembly includes a carrier and a first rolling member arranged on a side wall of the carrier, and the first rolling member has a protruding surface protruding from the side wall of the carrier. The fixing assembly includes a base. The base is provided with a first support member, and the first support member is provided with a metal guide rail extending along a direction of an optical axis. When the carrier is installed on the base, the protruding surface of the first rolling member comes into contact with the metal guide rail, and when the movable assembly moves, the first rolling member moves with the movable assembly and forms a rolling or sliding contact with the first support member.

According to some embodiments, the movable assembly further includes an elastic piece arranged in a locking groove on a side of the carrier. One side of the elastic piece is in contact with the first rolling member, and the other opposite side of the elastic piece is in contact with the carrier.

According to some embodiments, the movable assembly further includes a coil component, and when the carrier is installed on the base, the coil component is located on a surface of the carrier facing the base. One side of the elastic piece is in contact with the first rolling member to cause an elastic deformation to apply a rebound force to the first rolling member, and when the movable assembly moves, the coil component is electrically connected with a focusing control chip through the elastic piece, the first rolling member and the metal guide rail.

According to some embodiments, the base is further provided with a second support member, and the first support member and the second support member are symmetrically arranged around the base. The first support member and the second support member extend along a direction parallel to the direction of the optical axis, and the second support member is provided with a limiting groove extend along the direction parallel to the direction of the optical axis.

According to some embodiments, the movable assembly further includes a second rolling member, and the first rolling member and the second rolling member are respectively arranged on two opposite side walls of the carrier. The second rolling member has a protruding surface protruding from a side wall of the carrier, and the protruding surface of the second rolling member is in contact with the second support member. When the movable assembly moves, the second rolling member forms a rolling or sliding contact with the second supporting member.

According to some embodiments, the second rolling member is partially embedded in the limiting groove to enable the movable assembly to move stably along the direction of the optical axis.

According to some embodiments, the limiting groove has a V-shaped groove structure or a U-shaped groove structure.

According to some embodiments, the first rolling member is a conductive rolling ball.

According to some embodiments, the fixing assembly further includes at least one locking structure arranged on the base, and the locking structure includes a coil assembly and a magnet assembly facing the coil assembly. When the coil assembly is powered on, a magnetic field generated by the coil assembly interacts with a magnetic field of the magnet assembly to cause a relative movement between the coil assembly and the magnet assembly to lock or unlock the movable assembly.

According to some embodiments, the locking structure further includes a fixing portion, and the fixing portion includes a fixing base and a guide rail arranged on the fixing base. The guide rail extends along a direction parallel to a movement direction of the magnet assembly or the coil assembly.

According to some embodiments, the locking structure further includes an elastic support portion having one end fixedly connected with the magnet assembly.

According to some embodiments, when the coil assembly is powered on to cause the relative movement between the coil assembly and the magnet assembly, the elastic support portion is compressed and the movable assembly is unlocked.

According to some embodiments, when the coil assembly is powered off, the magnetic field of the coil assembly disappears, and the magnet assembly is driven by a rebound force of the elastic support portion to reset and the movable assembly is locked.

According to some embodiments, the locking structure further includes a locking slider, and a sliding member is arranged between the locking slider and the guide rail.

According to some embodiments, the locking slider has an accommodating chamber, and the magnet assembly is fixed in the accommodating chamber.

According to some embodiments, the locking slider has a locking tongue arranged on an outer wall of the accommodating chamber.

According to some embodiments, the locking structure is arranged on the base between adjacent first support members or on the base between adjacent second support members, or simultaneously arranged on the base between adjacent first support members and on the base between adjacent second support members.

According to some embodiments, the camera module further includes a plurality of magnets in a straight bar shape and symmetrically arranged on at least two opposite sides of the base, and the locking structure is arranged on another one side or two sides of the base.

According to some embodiments, the camera module further includes an iron housing arranged around the base for accommodating the movable assembly, the plurality of magnets and the locking structure, and the movable assembly moves up and down along the direction of the optical axis in the iron housing.

According to some embodiments, a groove is arranged on the side wall of the carrier, and when the movable assembly is unlocked, the locking tongue is located in the groove.

According to some embodiments, the base is further provided with a wire buried layer embedded in the base, one end of the wire buried layer is connected with the metal guide rail, and the other end of the wire buried layer is connected with the focusing control chip directly or through a printed circuit board, and when powered on, the wire buried layer, the first rolling member, the elastic piece and the coil component form an electrical connection.

According to some embodiments, the movable assembly further includes a lens assembly, the carrier is provided with a lens accommodating cavity extending through and protruding from a surface of the carrier, and the lens assembly is sleeved in the lens accommodating cavity.

According to some embodiments, the camera module further includes a lens protective sleeve. The lens protective sleeve has a hollow cavity, and the lens protective sleeve is sleeved on a top of the lens accommodating cavity. When the lens assembly moves, the lens assembly moves into the hollow cavity to isolate from the outside.

According to some embodiments, the camera module further includes a lens ring fixedly arranged at a top of the iron housing.

According to some embodiments, the camera module further includes a flexible connection structure arranged between the lens ring and the iron housing and connected with a bottom of the lens protective sleeve, and a space is formed between the flexible connection structure and the lens protective sleeve and between the flexible connection structure and the lens ring to prevent foreign objects from entering to affect an optical performance of the camera module.

According to some embodiments, the lens ring includes a bearing component arranged on the flexible connection structure, an elastic component arranged in the bearing component and a third rolling member arranged between the elastic component and the bearing component.

According to some embodiments, the elastic component includes an elastic opening ring, and the bearing component includes an inner ring wall, an outer ring wall and an annular convex strip arranged between the inner ring wall and the outer ring wall. The annular convex strip is provided with a dispensing groove and an opening, and the dispensing groove is configured to accommodate glue to adhere to a ring body of the elastic opening ring. One side of the third rolling member is in contact with the elastic opening ring, and the elastic opening ring is in an elastic active state. The third rolling member is arranged in the opening, and the elastic opening ring is arranged between the outer ring wall and the annular convex strip.

According to some embodiments, a number of openings is greater than or equal to three.

Another embodiment of the present disclosure provides a digital device. The digital device includes a device body and a camera module according to any one of preceding embodiments. The camera module is arranged in the device body.

The embodiments of the present disclosure have following advantages:

In the camera module of the present disclosure, as the first rolling member protrudes from the side wall of the carrier, the protruding surface of the first rolling member comes into contact with the metal guide rail. Therefore, when the movable assembly moves, the first rolling member moves with the movable assembly and forms a rolling or sliding contact with the fixing assembly, which enables the camera module to have a larger stroke and achieve a better imaging effect.

Furthermore, the fixing assembly further includes at least one locking structure arranged on the base, and the locking structure includes a coil assembly and a magnet assembly facing the coil assembly. When the coil assembly is powered on, a magnetic field generated by the coil assembly interacts with a magnetic field of the magnet assembly to cause a relative movement between the coil assembly and the magnet assembly to lock or unlock the movable assembly. The locking structure can be configured as an independent module for separate assembly, testing and maintenance, which can simplify an assembly process, ensure a high module yield and achieve a wide application range.

DETAILED DESCRIPTION

As mentioned in the background, how to effectively limit a movement of a camera module in a direction perpendicular to a direction of the optical axis, improve a stability of the camera module, and ensure a larger stroke of the camera module during an operation of the camera module is one urgent problem to be solved in the field of camera modules.

An embodiment of the present disclosure provides a camera module, which can ensure the stability of the camera module during the operation of the camera module. As a protruding surface of a first rolling member protrudes from a side wall of a carrier, the protruding surface of the first rolling member comes into contact with a metal guide rail. Therefore, when a movable assembly moves, the first rolling member moves with the movable assembly and forms a rolling or sliding contact with the fixing assembly, which enables the camera module to have a larger stroke and achieve a better imaging effect.

In order to make above objectives, features and advantages of the present disclosure more obvious and understandable, specific embodiments of the present disclosure will be explained in detail below in conjunction with accompanying drawings.

Figure 1:
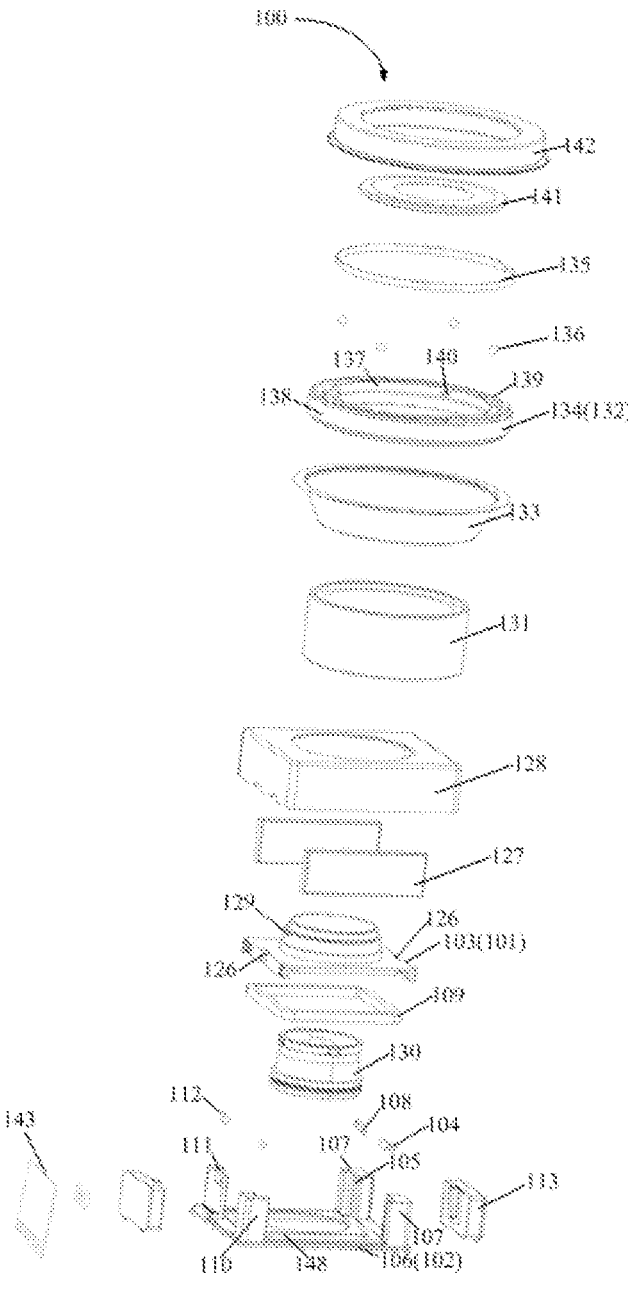
FIG. 1 illustrates an exploded structure view of a camera module according to an embodiment of the present disclosure.
Figure 2:
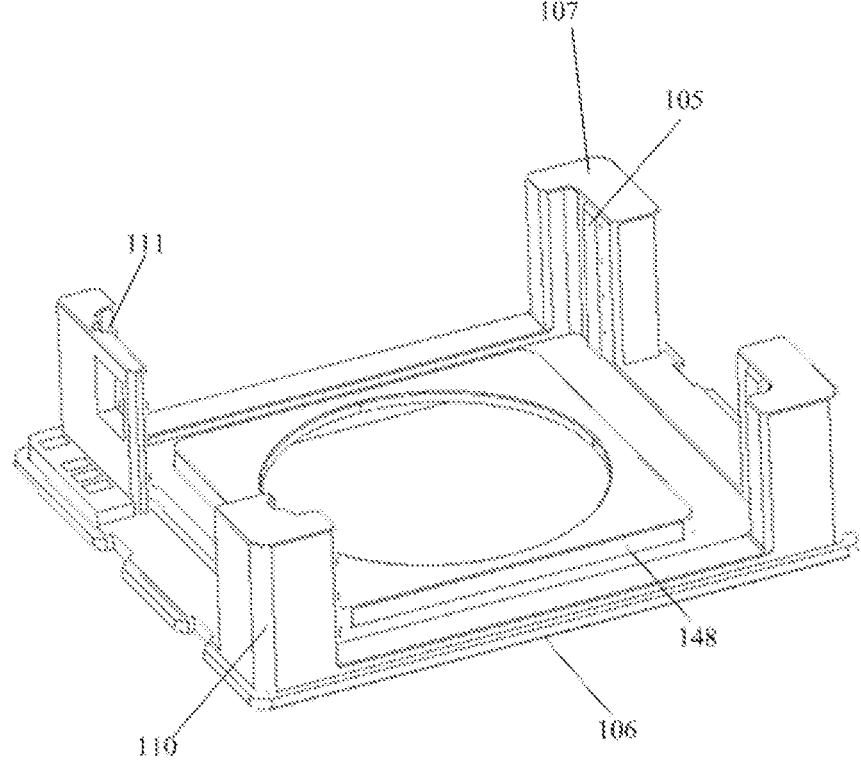
FIG. 2 illustrates a schematic structure view of a base according to an embodiment of the present disclosure.
Figure 3:
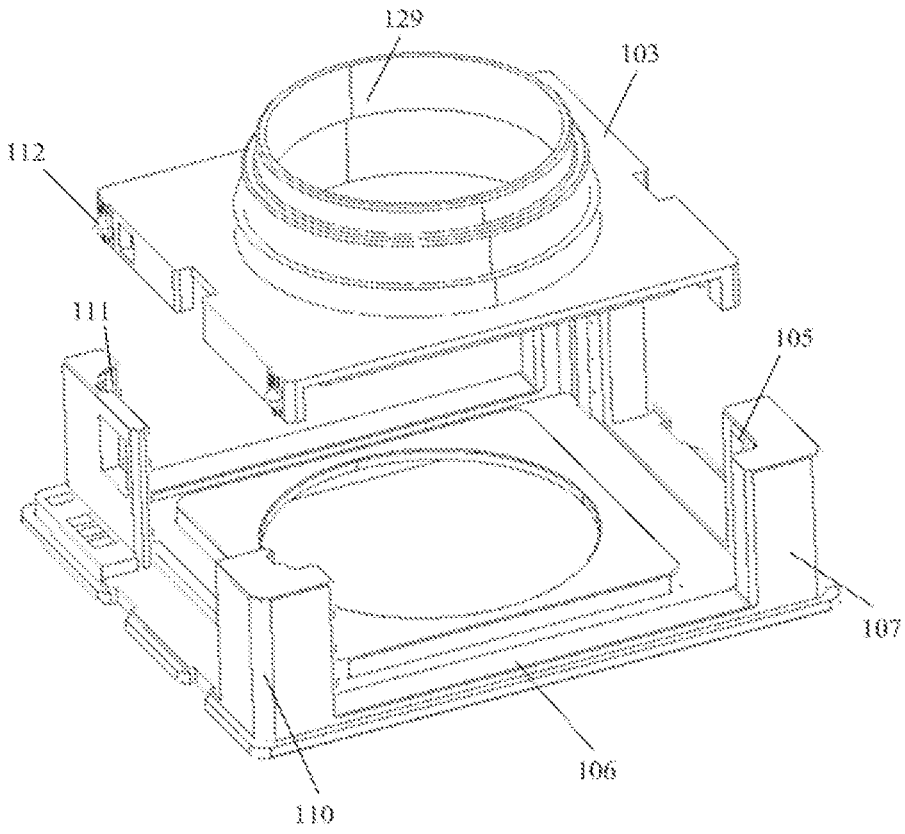
FIG. 3 illustrates an exploded assembly view of the base and a carrier according to an embodiment of the present disclosure.
Figure 4:
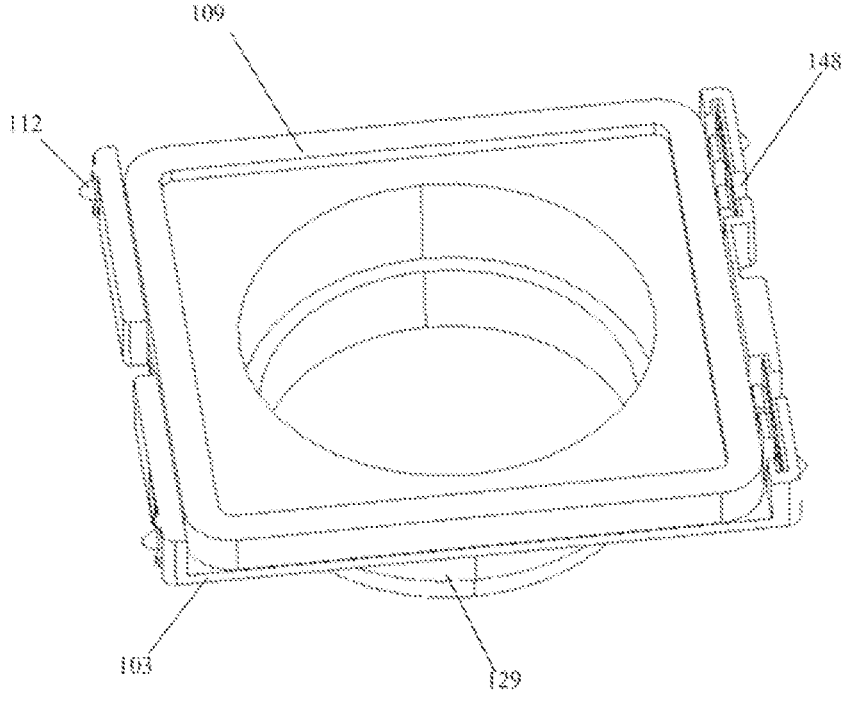
FIG. 4 illustrates an assembly view of the carrier and a coil according to an embodiment of the present disclosure.
Figure 5:
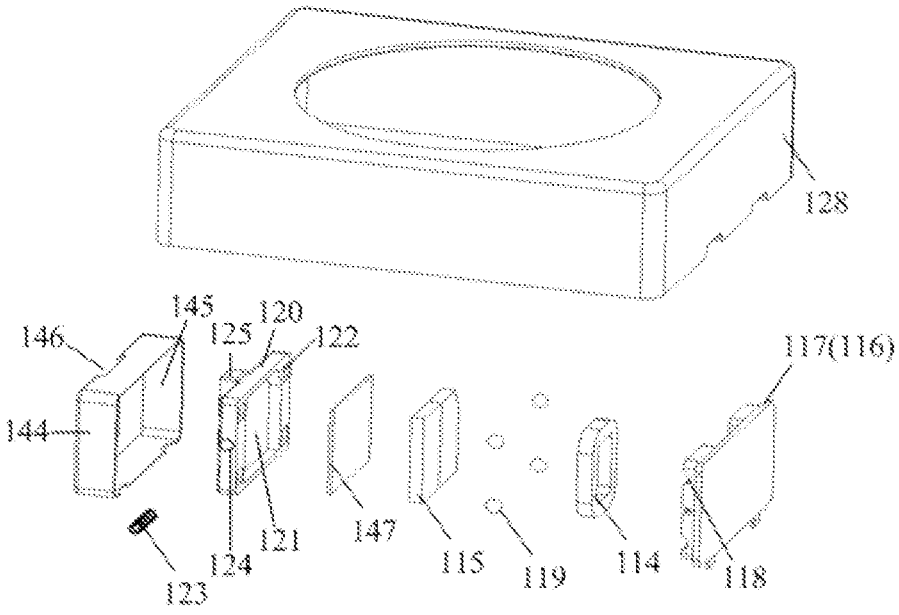
FIG. 5 illustrates an exploded structure view of a locking structure according to an embodiment of the present disclosure.
Figure 6:
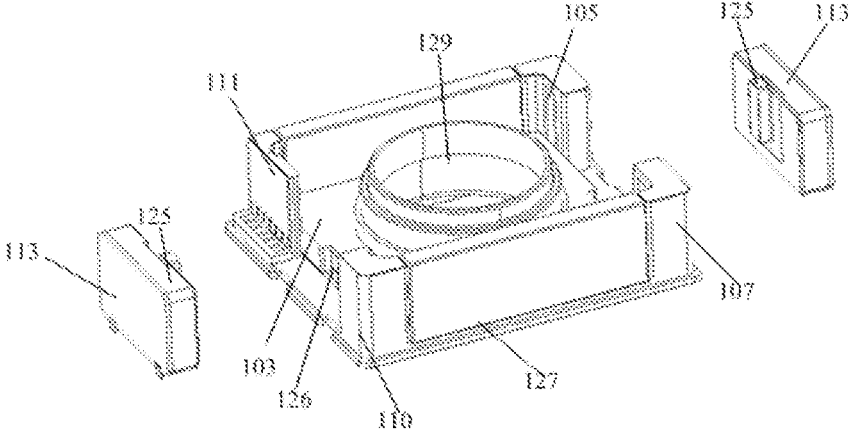
FIG. 6 illustrates a schematic structure view of the locking structure, the base, the carrier and a magnet according to an embodiment of the present disclosure.
Figure 7:
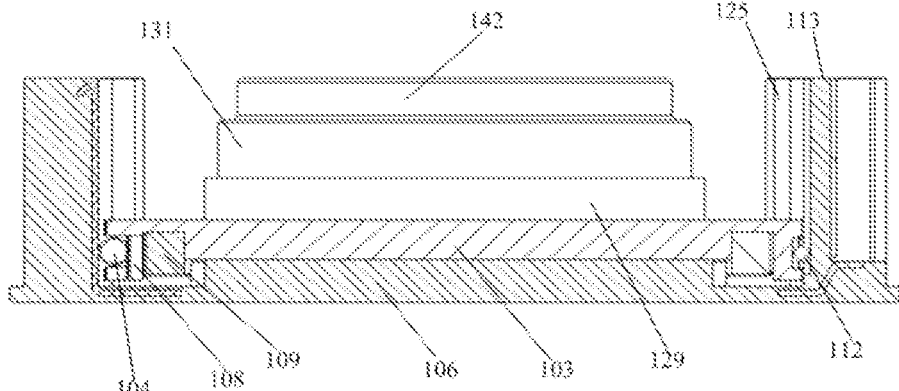
FIG. 7 illustrates a cross-sectional view of the camera module along a direction parallel to a direction of an optical axis according to an embodiment of the present disclosure.

FIG. 1 illustrates an exploded structure view of a camera module according to an embodiment of the present disclosure. FIG. 2 illustrates a schematic structure view of a base according to an embodiment of the present disclosure. FIG. 3 illustrates an exploded assembly view of the base and a carrier according to an embodiment of the present disclosure. FIG. 4 illustrates an assembly view of the carrier and a coil according to an embodiment of the present disclosure. FIG. 5 illustrates an exploded structure view of a locking structure according to an embodiment of the present disclosure. FIG. 6 illustrates a schematic structure view of the locking structure, the base, the carrier and a magnet according to an embodiment of the present disclosure. FIG. 7 illustrates a cross-sectional view of the camera module along a direction parallel to a direction of an optical axis according to an embodiment of the present disclosure.

In order to clearly show a relationship between a locking structure and a movable assembly, some components on the camera module are omitted in FIG. 7.

Referring to FIGS. 1 to 3, a camera module 100 includes a movable assembly 101 and a fixing assembly 102.

The movable assembly 101 includes a carrier 103 and a first rolling member 104 arranged on a side wall of the carrier 103. The first rolling member 104 has a protruding surface protruding from the side wall of the carrier 103.

The fixing assembly 102 includes a base 106. A first support member 107 is arranged on the base 106, and a metal guide rail 105 extending along a direction of an optical axis is arranged in the first support member 107.

When the carrier 103 is installed on the base 106, the protruding surface of the first rolling member 104 comes into contact with the metal guide rail 105. Thus, when the movable assembly 101 moves, the first rolling member 104 moves with the movable assembly 101 and forms a rolling or sliding contact with the first support member 107.

In some embodiments, when the movable assembly 101 moves, the first rolling member 104 rolls or slides on the metal guide rail 105, and the first rolling member 104 is arranged on the side wall of the carrier 103. Therefore, when the movable assembly 101 moves, a process of the first rolling member 104 moving with the movable assembly 101 is essentially a process of the movable assembly 101 moving with the first rolling member 104. Therefore, a distance of the first rolling member 104 moving on the metal guide rail 105 is equivalent to a stroke of the camera module 100. Therefore, since the first rolling member 104 can move a large distance on the metal guide rail 105, the camera module 100 has a larger stroke correspondingly, which can ensure a good imaging quality of the camera module 100.

In some embodiments, the first rolling member 104 is a conductive rolling ball. On the one hand, the conductive rolling ball plays a conductive role, and on the other hand, the conductive rolling ball can roll in the metal guide rail 105, which can reduce a frictional force generated by a movement of the movable assembly 101 and improve the imaging quality of the camera module.

In some embodiments, the first rolling member 104 may be removably connected with the side wall of the carrier 103. In other embodiments, the first rolling member 104 may also be fixedly connected with the side wall of the carrier 103.

In some embodiments, the first rolling member 104 may also be a rolling post.

In some embodiments, on the one hand, the metal guide rail 105 acts as a sliding rail, and on the other hand, the metal guide rail 105 plays a conductive role. When the camera module is powered on, the metal guide rail 105, the first rolling member 104 and the movable assembly 101 form an electrical connection.

Still referring to FIGS. 1 and 4, the movable assembly 101 further includes an elastic piece 108 and a coil component 109.

The elastic piece 108 is installed in a locking groove 148 on a side of the carrier. One side of the elastic piece 108 in contact with the first rolling member 104, and the other opposite side is in contact with the carrier 103.

When the carrier 103 is installed on the base 106, the coil component 109 is located on a surface of the carrier 103 facing the base 106. The other opposite side of the elastic piece 108 contacts the coil component 109 to cause an elastic deformation to apply a rebound force to the first rolling member 104. When the movable assembly 101 moves, the coil component 109 is electrically connected with a focusing control chip through the elastic piece 108.

In some embodiments, referring to FIG. 4, the coil component 109 is arranged on the surface of the carrier 103 facing the base 106. That is, installing the coil component 109 at a bottom can reduce a required height of the carrier 103, which can minimize a shoulder height of the voice coil motor under the same stroke. In some embodiments, due to the presence of the elastic piece 108, on the one hand, an electrical connection is formed between the elastic piece 108 and the coil component 109 when the movable assembly 101 moves, and on the other hand, an elastic deformation is formed between the elastic piece 108 and the coil component 109, and a rebound force perpendicular to the direction of the optical axis and pointing towards the optical axis is applied to the first rolling member 104, which can limit the movement of the movable assembly 101 in the direction perpendicular to the direction of the optical axis, and improve a movement stability of the movable assembly 101 in the direction of the optical axis.

Stilling referring to FIGS. 1 to 3, the base 106 further includes a second support member 110.

In some embodiments, the first support member 107 and the second support member 110 are symmetrically distributed around the base 106. The first support member 107 and the second support member 110 extend in a direction parallel to the direction of the optical axis, and a limiting groove 111 extending along the direction parallel to the direction of the optical axis is arranged in the second support member 110.

In some embodiments, the limiting groove 111 may have a V-shaped groove structure.

In some embodiments, the limiting groove 111 may also have a U-shaped groove structure.

In some embodiments, the limiting groove 111 can provide a space for the rolling or sliding of the second rolling member.

Stilling referring to FIGS. 1 and 3, the movable assembly 101 further includes a second rolling member 12.

The first rolling member 104 and the second rolling member 112 are respectively arranged on a pair of opposite side walls of the carrier 103. The second rolling member 112 has a protruding surface protruding from a side wall of the carrier 103, and the protruding surface of the second rolling member 112 is in contact with the second support member 110. Therefore, when the movable assembly 101 moves, the second rolling member 112 forms a rolling or sliding contact with the second support member 110.

In some embodiments, the second rolling member 112 may be removably connected with the side wall of the carrier 103. In other embodiments, the second rolling member 112 may also be fixedly connected with the side wall of the carrier 103.

In some embodiments, the second rolling member 112 is locked to the side wall of the carrier 103. A clamping groove is arranged on a side wall of the carrier 103. One side of the second rolling member 112 is clamped in the clamping groove, and the other side of the second rolling member 112 protrudes from the side wall of the carrier 103. The second rolling member 112 can rotate in the clamping groove.

In some embodiments, the second rolling member 112 forms a rolling or sliding contact with the second support member 110.

In some embodiments, the first rolling member 104 and the second rolling member 112 cooperate with each other, and when the movable assembly 101 moves, the movable assembly 101 can have a larger moving distance, which can ensure that the camera module has a larger stroke and improve the imaging quality of the camera module.

In some embodiments, the second rolling member 112 is partially embedded in the limiting groove 111 to ensure a stable movement of the movable assembly 101 along the direction of the optical axis.

In some embodiments, the limiting groove 111 has a V-shaped groove structure. When the second rolling member 112 is partially embedded in the limiting groove 111, on the one hand, a contact between the second rolling member 112 and the limiting groove 111 is a two-point contact, which can reduce a motion friction force between the second rolling member 112 and the limiting groove 111 and facilitate the rolling of the second rolling member 112, and on the other hand, a contact between the limiting groove 111, the carrier 103 and the second rolling member 112 is a three-point contact, and when the movable assembly 101 moves, the second rolling member 112 can move with the movable assembly 101 and rotate in the limiting groove 111, which can achieve a rolling or sliding contact between the second rolling member 112 and the second support member 110.

In some embodiments, the base 106 further includes a circuit board 143. The circuit board 143 is equipped with a driver chip, a Hall sensor, a printed circuit board, etc.

In some embodiments, a wire burial layer (not shown in the figure) is arranged in the base 106, which helps to reduce product thickness. The wire burial layer may be embedded in the base. One end of the wire burial layer is connected with the metal guide rail, and the other end of the wire burial layer is connected with the focusing control chip directly or through a printed circuit board. When powered on, the wire burial layer, the first rolling member, the elastic piece and the coil component form an electrically connection.

Referring to FIGS. 5 to 7, the fixing assembly 102 further includes at least one locking structure 113.

As shown in FIG. 7, an iron housing is partially shown in transparent.

In some embodiments, when the camera module is not operating, the locking structure 113 can lock the movable assembly 101 in the direction perpendicular to the direction of the optical axis, which can reduce damage to the lens assembly caused by an external force impact, protect the camera module and improve the product yield of the camera module.

In some embodiments, the locking structure 113 is installed on the base 106, and the locking structure 113 includes a coil assembly 114 and a magnet assembly 115. The magnet assembly 115 is arranged opposite to the coil assembly 114. When the coil assembly 114 is powered on, a direction of a magnetic field generated by the coil assembly 114 is opposite to a direction of a magnetic field of the magnet assembly 115 to cause a relative movement between the coil assembly 114 and the magnet assembly 115 to lock or unlock the movable assembly 101.

In some embodiments, the direction of the magnetic field generated by the coil assembly 114 is opposite to the direction of the magnetic field of the magnet assembly 115 when powered on, which causes the relative movement between the coil assembly 114 and the magnet assembly 115. The locking structure 113 has a simple and stable structure and ensures a better reliability of the electrical connection, which can be assembled, tested and repaired separately to simplify the assembly process and ensure a high module yield.

In some embodiments, the number of locking structures 113 may be two.

In some embodiments, the number of the locking structures 113 may also be one. The number of the locking structures 113 may be selected based on actual design of the camera module.

In some embodiments, the locking structure 113 is arranged on the base 106 between adjacent first support members 107.

In some embodiments, the locking structure 113 may also be arranged on the base 106 between adjacent second support members 110, or simultaneously arranged on the base 106 between adjacent first support members 107 and on the base 106 between adjacent second support members 110.

In some embodiments, still referring to FIG. 5, the locking structure 113 further includes a fixing portion 116. The fixing portion 116 includes a fixing base 117 and a guide rail 118 arranged on the fixing base 117. The guide rail 118 extends in a direction parallel to a movement direction of the magnet assembly 115 or the coil assembly 114.

In some embodiments, a sliding member 119 is arranged in the guide rail 118. One side of the sliding member 119 is in contact with the guide rail 118 for sliding in the guide rail 118, and the other side of the sliding member 119 is relatively fixed with the magnet assembly 115 or the coil assembly 114 to drive the magnet assembly 115 or the coil assembly 114 to move.

Still referring to FIG. 5, the locking structure 113 further includes a locking slider 120.

In some embodiments, the locking slider 120 has an accommodating chamber 121, and the magnet assembly 115 is fixed in the accommodating chamber 121. The other side of the sliding member 119 is clamped in the clamping groove 122 on the locking slider 120, thus when the sliding member 119 slides in the guide rail 118, the sliding member 119 drives the magnet assembly 115 to slide relative to the coil assembly 114.

In some embodiments, the magnet assembly 115 may also be fixed and the coil assembly 114 may slide relative to the magnet assembly 115.

Still referring to FIG. 5, the locking structure 113 further includes an elastic support portion 123.

One end of the elastic support portion 123 is fixed to the magnet assembly 115.

In some embodiments, a connecting hole portion 124 is provided on a side wall of the accommodating chamber 121, and one end of the elastic support portion 123 is inserted into the connecting hole portion 124 to form a fixed connection between the elastic support portion 123 and the magnet assembly 115.

In some embodiments, there is no connection hole portion provided on the side wall of the accommodating chamber 121, and one end of the elastic support portion can be bonded or clamped together with a surface of the side wall of the accommodating chamber 121.

In some embodiments, when the coil assembly 114 is powered on, there is a relative movement between the coil assembly 114 and the magnet assembly 115, and then the elastic support portion 123 is compressed and the movable assembly 101 is unlocked.

In some embodiments, when the coil assembly 114 is powered off, the magnetic field of the coil assembly 114 disappears, the magnet assembly 115 is driven by a rebound force of the elastic support portion 123 to reset and the movable assembly 101 is locked.

Still referring to FIG. 5, the locking slider 120 has a locking tongue 125.

In some embodiments, the locking tongue 125 is arranged on an outer wall of the accommodating chamber 121.

When the coil assembly 114 is powered off, the locking tongue 125 slides onto the movable assembly 101 to lock the movable assembly 101. When the coil assembly 114 is powered on, the locking tongue 125 slides into a groove on the movable assembly 101 to unlock the movable assembly 101.

Specifically, referring to FIGS. 6 and 7, in some embodiments, a groove 126 is arranged on the side wall of the carrier 103. When the movable assembly 101 is unlocked, the locking tongue 125 is located in the groove 126.

In some embodiments, the locking structure 113 further includes a housing 144. One side of the housing 144 is provided with an installation groove 145, and the locking slider 120 is installed in the installation groove 145. When there is a relative movement the coil assembly 114 and the magnet assembly 115 the other end of the elastic support portion 123 abuts against a side wall of the installation groove 145 to be compressed. The installation groove 145 is provided with a through hole 146, and the locking tongue 125 passes through the through hole 146.

In some embodiments, the locking structure 113 further includes a reinforcement magnetic conductive sheet 147 adsorbed to a surface of the magnet assembly 115, and the reinforcement magnetic conductive sheet 147 is arranged between the magnet assembly 115 and the accommodating chamber 121.

In some embodiments, the reinforcement magnetic conductive sheet 147 can increase the magnetism of the magnet assembly 115.

Still referring to FIGS. 1 and 6, the camera module further includes a plurality of magnets 127.

In some embodiments, the magnets 127 have a straight bar shape and are symmetrically arranged on at least two opposite sides of the base 106, and the locking structure 113 is arranged on another one side or two sides of the base 106.

Still referring to FIG. 1, the camera module further includes an iron housing 128.

In some embodiments, the iron housing 128 is arranged around the base 106 for accommodating the movable assembly 101, the magnets 127 and the locking structure 113. The movable assembly 101 moves up and down along the direction of the optical axis in the iron housing 128.

Still referring to FIG. 1, the carrier 103 has a lens accommodating cavity 129. The lens accommodating cavity 129 passes through and protrudes from a surface of the carrier 103, and the lens assembly 130 in the movable assembly 101 is sleeved in the lens accommodating cavity 129.

Still referring to FIG. 1, the camera module further includes a lens protective sleeve 131.

The lens protective sleeve 131 has a hollow cavity and the lens protective sleeve 131 is sleeved on a top of the lens accommodating cavity 129. When the lens assembly moves, the lens assembly 130 moves into the hollow cavity to isolate from the outside.

Still referring to FIG. 1, the camera module further includes a lens ring 132.

The lens ring 132 is fixed to a top of the iron housing 128.

In some embodiments, the camera module further includes a flexible connection structure 133. The flexible connection structure 133 is arranged between the lens ring 132 and the iron housing 128 and connected to a bottom of the lens protective sleeve 131. A space is formed between the flexible connection structure 133 and the lens protective sleeve 131 and between the flexible connection structure 133 and the lens ring 132 to prevent foreign objects from entering to affect an optical performance of the camera module.

The foreign objects include impurities such as water, oil, dust, etc., which may affect the clarity of the lens assembly.

In some embodiments, the lens ring 132 includes a bearing component 134 arranged on the flexible connection structure 133, an elastic component 135 arranged in the bearing component 134, and a third rolling member 136 arranged between the elastic component 135 and the bearing component 134.

In some embodiments, when the lens assembly 130 is subjected to a force on one side, a rebound force of the elastic component 135 can force the lens assembly 130 to reset to an original position to maintain a movement direction of the lens assembly 130 to be consistent with the direction of the optical axis.

In some embodiments, the elastic component 135 includes an elastic opening ring, and the bearing component 134 includes an inner ring wall 137, an outer ring wall 138 and an annular convex strip 139 arranged between the inner ring wall 137 and the outer ring wall 138. The annular convex strip 139 is provided with a dispensing groove (not marked in the figure) and an opening 140. The dispensing groove is configured to accommodate glue to adhere to a ring body of the elastic opening ring. One side of the third rolling member is in contact with the elastic opening ring, and the elastic opening ring is in an elastic active state. The third rolling member 136 is arranged in the opening 140, and the elastic opening ring is arranged between the outer ring wall 138 and the annular convex strip 139.

In some embodiments, the number of openings 140 is greater than or equal to three.

In some embodiments, the third rolling member 136 is a steel ball, and a friction between the steel ball and a moving member is a rolling friction with a small friction coefficient, which can make the moving member move more smoothly.

In some embodiments, the camera module further includes a protective glass 141 and a protective housing 142 for sealing the lens assembly 130 and completely isolating the lens assembly 130 from the external environment by wrapping the entire lens assembly 130 inside.

Still referring to FIG. 2, the base 106 is further provided with a step portion 148 to ensure a waterproof and dustproof performance of the voice coil motor.

Another embodiment of the present disclosure provides a digital device. The digital device includes a device body and a camera module according to any one of preceding embodiments. The camera module is arranged in the device body.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A camera module, comprising:
   a movable assembly comprising a carrier and a first rolling member arranged on a side wall of the carrier, wherein the first rolling member has a protruding surface protruding from the side wall of the carrier; and
   a fixing assembly comprising a base, wherein the base is provided with a first support member, and the first support member is provided with a metal guide rail extending along a direction of an optical axis, wherein when the carrier is installed on the base, the protruding surface of the first rolling member comes into contact with the metal guide rail, and when the movable assembly moves, the first rolling member moves with the movable assembly and forms a rolling or sliding contact with the first support member;
   wherein the base is further provided with a second support member, and the first support member and the second support member are symmetrically arranged around the base, wherein the first support member and the second support member extend along a direction parallel to the direction of the optical axis, and the second support member is provided with a limiting groove extend along the direction parallel to the direction of the optical axis;
   wherein the fixing assembly further comprises at least one locking structure arranged on the base, and the locking structure comprises a coil assembly and a magnet assembly facing the coil assembly, wherein when the coil assembly is powered on, a magnetic field generated by the coil assembly interacts with a magnetic field of the magnet assembly to cause a relative movement between the coil assembly and the magnet assembly to lock or unlock the movable assembly;
   wherein the locking structure further comprises a fixing portion, and the fixing portion comprises a fixing base and a guide rail arranged on the fixing base, wherein the guide rail extends along a direction parallel to a movement direction of the magnet assembly or the coil assembly, wherein the locking structure further comprises an elastic support portion having one end fixedly connected with the magnet assembly.

2. The camera module according to claim 1, wherein the movable assembly further comprises an elastic piece arranged in a locking groove on a side of the carrier, wherein one side of the elastic piece is in contact with the first rolling member, and the other opposite side of the elastic piece is in contact with the carrier.

3. The camera module according to claim 2, wherein the movable assembly further comprises a coil component, and when the carrier is installed on the base, the coil component is located on a surface of the carrier facing the base, wherein one side of the elastic piece is in contact with the first rolling member to cause an elastic deformation to apply a rebound force to the first rolling member, and when the movable assembly moves, the coil component is electrically connected with a focusing control chip through the elastic piece, the first rolling member and the metal guide rail.

4. The camera module according to claim 3, wherein the base is further provided with a wire buried layer embedded in the base, one end of the wire buried layer is connected with the metal guide rail, and the other end of the wire buried layer is connected with the focusing control chip directly or through a printed circuit board, wherein when powered on, the wire buried layer, the first rolling member, the elastic piece and the coil component form an electrical connection.

5. The camera module according to claim 1, wherein the movable assembly further comprises a second rolling member, and the first rolling member and the second rolling member are respectively arranged on two opposite side walls of the carrier, wherein the second rolling member has a protruding surface protruding from a side wall of the carrier, and the protruding surface of the second rolling member is in contact with the second support member, wherein when the movable assembly moves, the second rolling member forms a rolling or sliding contact with the second supporting member, wherein the second rolling member is partially embedded in the limiting groove to enable the movable assembly to move stably along the direction of the optical axis.

6. The camera module according to claim 1, wherein when the coil assembly is powered on to cause the relative movement between the coil assembly and the magnet assembly, the elastic support portion is compressed and the movable assembly is unlocked, wherein when the coil assembly is powered off, the magnetic field of the coil assembly disappears, and the magnet assembly is driven by a rebound force of the elastic support portion to reset and the movable assembly is locked.

7. The camera module according to claim 1, wherein the locking structure further comprises a locking slider, and a sliding member is arranged between the locking slider and the guide rail.

8. The camera module according to claim 7, wherein the locking slider has an accommodating chamber, and the magnet assembly is fixed in the accommodating chamber, wherein the locking slider has a locking tongue arranged on an outer wall of the accommodating chamber, wherein a groove is arranged on the side wall of the carrier, and when the movable assembly is unlocked, the locking tongue is located in the groove.

9. The camera module according to claim 1, wherein the base is provided with two adjacent first support members and two adjacent second support members, wherein the locking structure is arranged on the base between the two adjacent first support members or on the base between the two adjacent second support members, or simultaneously arranged on the base between the two adjacent first support members and on the base between the two adjacent second support members.

10. The camera module according to claim 1, further comprising a plurality of magnets in a straight bar shape and symmetrically arranged on at least two opposite sides of the base, wherein the locking structure is arranged on another one side or two sides of the base.

11. The camera module according to claim 10, further comprising an iron housing arranged around the base for accommodating the movable assembly, the plurality of magnets and the locking structure, wherein the movable assembly moves up and down along the direction of the optical axis in the iron housing.

12. The camera module according to claim 11, wherein the movable assembly further comprises a lens assembly, wherein the carrier is provided with a lens accommodating cavity extending through and protruding from a surface of the carrier, and the lens assembly is sleeved in the lens accommodating cavity, wherein the camera module further comprises a lens protective sleeve, wherein the lens protective sleeve has a hollow cavity, and the lens protective sleeve is sleeved on a top of the lens accommodating cavity, wherein when the lens assembly moves, the lens assembly moves into the hollow cavity to isolate from the outside.

13. The camera module according to claim 12, further comprising a lens ring fixedly arranged at a top of the iron housing.

14. The camera module according to claim 13, further comprising a flexible connection structure arranged between the lens ring and the iron housing and connected with a bottom of the lens protective sleeve, wherein a space is formed between the flexible connection structure and the lens protective sleeve and between the flexible connection structure and the lens ring to prevent foreign objects from entering to affect an optical performance of the camera module.

15. The camera module according to claim 14, wherein the lens ring comprises a bearing component arranged on the flexible connection structure, an elastic component arranged in the bearing component and a third rolling member arranged between the elastic component and the bearing component.

16. The camera module according to claim 15, wherein the elastic component comprises an elastic opening ring, and the bearing component comprises an inner ring wall, an outer ring wall and an annular convex strip arranged between the inner ring wall and the outer ring wall, wherein the annular convex strip is provided with a dispensing groove and an opening, and the dispensing groove is configured to accommodate glue to adhere to a ring body of the elastic opening ring, wherein one side of the third rolling member is in contact with the elastic opening ring, and the elastic opening ring is in an elastic active state, wherein the third rolling member is arranged in the opening, and the elastic opening ring is arranged between the outer ring wall and the annular convex strip.

\* \* \* \* \*